Sept. 24, 1963 W. B. CALLAWAY 3,105,115
EQUIPMENT HOLDING TIME DISTRIBUTION ANALYZER
Filed July 1, 1960 7 Sheets-Sheet 1

INVENTOR
W. B. CALLAWAY
BY Donald M Duft
ATTORNEY

Sept. 24, 1963     W. B. CALLAWAY     3,105,115
EQUIPMENT HOLDING TIME DISTRIBUTION ANALYZER
Filed July 1, 1960     7 Sheets-Sheet 3

INVENTOR
W. B. CALLAWAY
BY *Donald M Duft*
ATTORNEY

Sept. 24, 1963 W. B. CALLAWAY 3,105,115
EQUIPMENT HOLDING TIME DISTRIBUTION ANALYZER
Filed July 1, 1960 7 Sheets-Sheet 4

INVENTOR
W. B. CALLAWAY
BY Donald M Duft
ATTORNEY

United States Patent Office 3,105,115
Patented Sept. 24, 1963

3,105,115
EQUIPMENT HOLDING TIME DISTRIBUTION ANALYZER
William B. Callaway, Bloomfield, N.J., assignor to Bell Telephone Laboratories, Incorporated, New York, N.Y., a corporation of New York
Filed July 1, 1960, Ser. No. 40,307
10 Claims. (Cl. 179—8)

This invention relates to a system for determining distribution functions and more particularly to a system for determining the distribution of equipment holding times.

Present day business concerns often conduct frequent statistical studies regarding equipment use in order to achieve and maintain a high level of efficiency in their operations. In the telephone industry one such statistical study that provides useful information in this connection is the determination of the distribution of time durations that various equipments are held in service during each call. Each such time duration is commonly referred to as a "holding time" and will be so designated throughout the remainder of this specification.

Information regarding holding time distribution is useful since it facilitates a determination as to whether the observed equipment is being utilized efficiently and whether the optimum quantity of such equipment is provided to furnish the required service. For example, in common control switching systems of the crossbar type, certain units of equipment, such as senders and markers, are used only a short time during the establishment of a call and, once they have served a particular call they release and serve subsequent calls. Inasmuch as markers and senders are relatively expensive, it is important that no more be provided in any office than is necessary to serve the anticipated traffic therethrough. However, it is just as important that a sufficient number be provided so that the system of which they are a part will furnish service of the quality to which present day telephone subscribers are accustomed.

The number of common control circuits required in an office is dependent, in part, upon the time required by each such circuit to serve a call. For example, studies have shown that senders in some crossbar systems are held on an average of 12 seconds during the establishment of each call. Once this information is known, the number of such circuits required in any office can readily be ascertained by dividing the total calls per hour by the hourly call capacity of a sender.

Statistical studies regarding equipment use are important not only in planning the installation of new offices or of additional equipment in old offices; they are also important in determining whether presently installed equipment is being utilized in an optimum manner. Thus, telephone companies make frequent equipment traffic studies in order to derive various information including the number of calls served, the percentage of time each item of equipment is busy serving calls, the holding times required in serving calls, and the distribution of holding times. Of all this data, the distribution of holding times is one of the most important since it serves to indicate whether equipment is being used inefficiently, such as, if it is being held too long on some calls and, hence, is not rendering the quantity of service for which it was designed. Once it is ascertained that this is the case, remedial action can be taken to find out why the equipment requires more time per call than was anticipated during its design.

Sophisticated methods and equipment are presently available for deriving such information as the number of calls served, percentage of busy time, etc. Although holding time distribution data is most useful, there has been heretofore no method by which it could be obtained without considerable manual effort. In the past, this information was obtained by connecting a pen recorder or the like to the observed equipment, manually finding the duration of each busy period from the record produced by the recorder, and from this, manually determining the distribution of holding times.

It is, therefore, an object of the invention to facilitate the determination of distribution of equipment holding times.

It is a further object of the invention to determine the distribution of equipment holding times by wholly automatic means.

In accordance with the present invention, an analyzer is provided which automatically determines the distribution of equipment holding times upon the reception of information representing the duration of each equipment busy period. The specific nature of the received information is not critical and its only requirement is that it must clearly manifest when the observed equipment is busy and when it is idle.

The analyzer comprises a multiposition distributor having a register individual to each position, a beginning and an end of busy period recognition circuit, and a reset circuit. The reception of information manifesting an equipment busy period causes the distributor to advance from position to position at a fixed rate for the duration of the busy period. The end of each busy period (the termination of reception of information) is detected by the analyzer and the particular register is operated which is associated with the then current output position of the distributor. Shortly thereafter, the distributor is returned to its normal position to await the reception of information for the next busy period. This stepping action of the distributor is repeated for each following busy period, as represented by the subsequently received information, and each time the appropriate register is operated in accordance with the final output position to which the distributor has advanced.

Each output position of the distributor together with its associated register represents a unique range of holding times, and thus, over a period of time, each register will be operated a number of times in accordance with the number of times the observed equipment was held busy for the time duration represented thereby. By this expedient, the setting of the registers at the end of an analyzing period represents the desired distribution of equipment holding times.

The particular holding time duration represented by each output position of the distributor is determined, in part, by the nature of the equipment under observation. For example, if the maximum holding time to be analyzed is 60 seconds and if observations are made once a second, a 10 position distributor could be used with each position representing a range of 6 seconds. The first distributor output position together with its register would then represent the range of 0–5 seconds, the second, 6–11 seconds, the third, 12–17 seconds, and so on up to the last position which would represent 54–60 seconds.

Continuing with this example, if the received information for the first busy period represents a holding time of 3 seconds, the distributor would remain in its first position and the register connected thereto would be operated upon the end of this busy period. If the received information for the second busy period represents a holding time of 57 seconds, the distributor would advance to its tenth position during the reception of this information and the register connected thereto would operate upon the termination of the busy period.

The analyzer continues to operate in this manner for subsubsequent busy periods and the setting of each register at the end of the analyzing period represents the number of times the observed equipment was held busy for the time duration represented thereby. It may therefore be seen that the present invention provides a new and novel means of deriving holding time distribution without the necessity of the long and complicated manual computations heretofore required.

A feature of the invention relates to a means for determining equipment holding time distribution in response to the receipt of information manifesting the duration of each busy period.

A further feature of the invention relates to a distribution analyzer comprising a multiposition distributor which advances from position to position for the duration of each equipment busy period and which operates a register connected to its operated position at the end of each busy period.

A further feature of the invention relates to the provision of a multiposition distributor having a register connected to each position for determining equipment holding time distribution wherein the operation of the distributor is controlled by the receipt of information manifesting the duration of each equipment busy period and wherein the end of each busy period operates the register connected to the position to which the distributor has advanced.

A further feature of the invention relates to the provision of an equipment holding time distribution analyzer comprising a multiposition distributor, a register connected to each distributor position, and a distributor driving source wherein the reception of information manifesting the duration of each busy period interconnects the driving source to the distributor to advance it from position to position for the duration of each busy period and wherein the termination of each busy period operates the register connected to the current position of the distributor.

A further feature of the invention relates to the provision of a distribution analyzer comprising a pulse generator, a gate, and a multiposition distributor having a register connected to each position wherein the reception of information manifesting the duration of each busy period causes the gate to interconnect the pulse generator with the distributor to advance it from position to position for the duration of each busy period and wherein the end of each busy period operates the register associated with the position to which the distributor has advanced.

A further feature of the invention relates to a means for determining the distribution of the quantity of pulses per group in a series of sequentially received pulse groups comprising a multiposition distributor which is sequentially advanced from position to position during the reception of each pulse group together with means for operating a register connected to the current operated position of the distributor at the time the last pulse in a group is received.

These and other features and objects of the invention will become apparent upon consideration of the following description taken in conjunction with the drawings in which.

GENERAL DESCRIPTION

Figures 1, 7, 8:
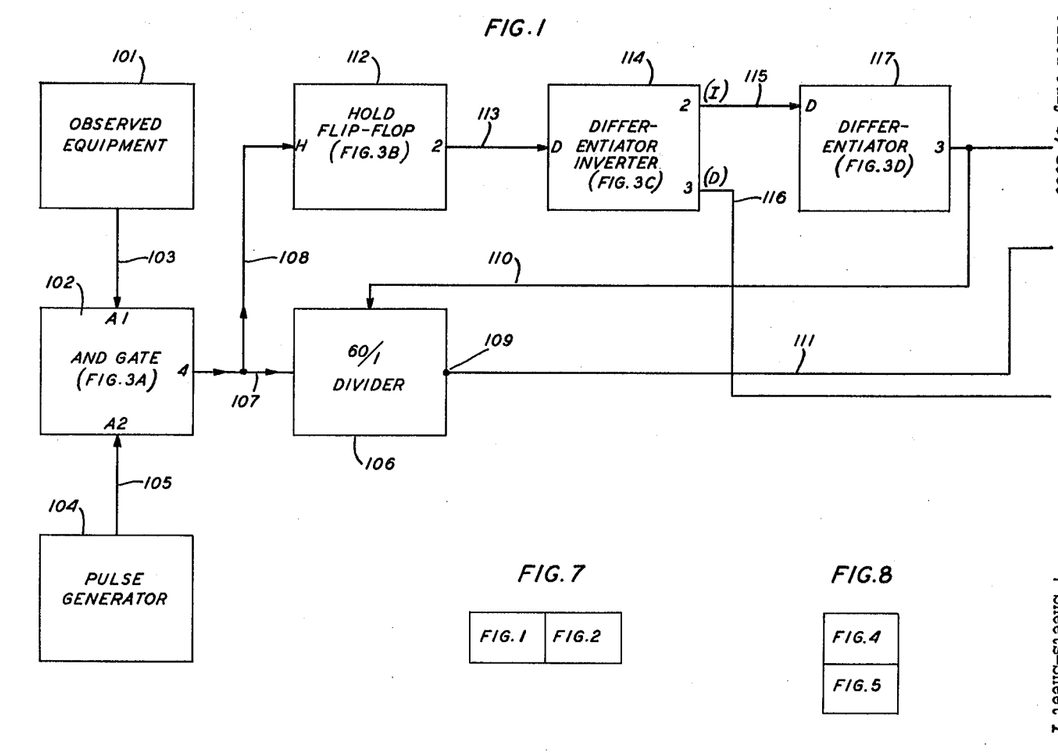
FIGS. 1 and 2 together disclose an exemplary embodiment of the invention in diagrammatic form.
FIG. 7 shows how FIGS. 1 and 2 should be arranged with respect to each other.
FIG. 8 shows how FIGS. 4 and 5 should be arranged with respect to each other.
Figure 2:
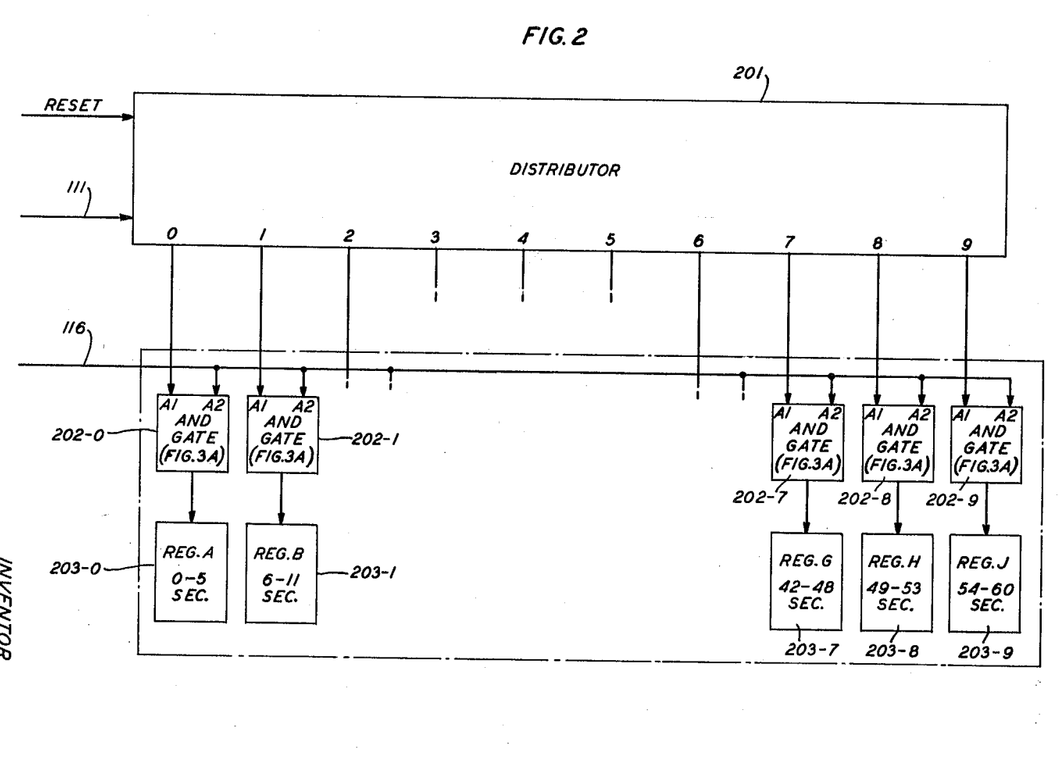

Referring to FIGS. 1 and 2, a multiposition distributor 201 is shown having a gate 202 and a register 203 connected to each of its output positions. The distributor has ten output positions 0–9 and each register functionally represents a holding time range of 6 seconds in accordance with the previously discussed example.

The observed equipment whose holding time distribution is to be analyzed is represented by the rectangle 101. This equipment may be of any type, i.e., mechanical, electromagnetic, or electronic. The signals representing equipment busy periods are transmitted over conductor 103 to AND gate 102. The specific nature of the signals is not important and the only requirements thereof are that the gate be capable of detecting a distinction between signals representing equipment busy conditions and signals (or the lack thereof) representing idle conditions. For example, a voltage of a predetermined magnitude or polarity could represent a busy condition while a voltage of a different magnitude or different polarity could represent an idle condition.

Figure 3A:
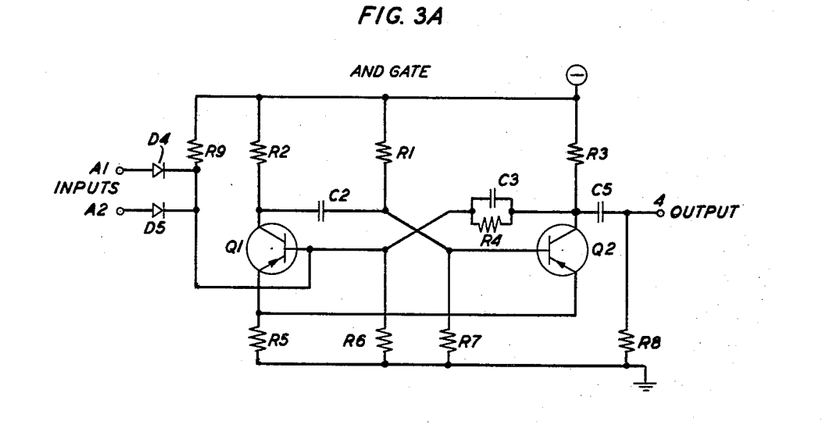
FIG. 3A discloses the circuit details of the AND gates used in the present invention.

Pulse generator 104 generates pulses which are applied to gate 102 and which, together with the busy signals from equipment 101, control the operation of the analyzer. AND gate 102 opens only upon the simultaneous reception of busy signals from equipment 101 and pulses from pulse generator 104. The opening of the gate permits the pulses applied to its input terminal A2 from generator 104 to be applied to its output terminal 4 and thence over conductors 107 and 108 to divider 106 and Hold flip-flop 112. By this expedient, the output pulses of generator 104 are passed by the AND gate and are applied to conductors 107 and 108 only when the observed equipment is busy and, conversely, no pulses are applied thereto during idle periods of the equipment 101. The circuit details of AND gate 102 are shown in FIG. 3A and the terminal designation within box 102 correspond to the similarly designated terminals of FIG. 3A.

The pulse generator is shown in diagrammatic form only since its details comprise no portion of the present invention. Any pulse generator of the prior art could be used provided it furnished output pulses of the required amplitude, polarity and frequency. Included in the circuits that could be used for this purpose are a blocking oscillator, a multivibrator or a sine-wave oscillator followed by an amplitude clipper and differentiator. Such circuits are well known and the incorporation of any one of them into the present system would require only routine, rather than inventive, circuit knowledge.

Figure 6:
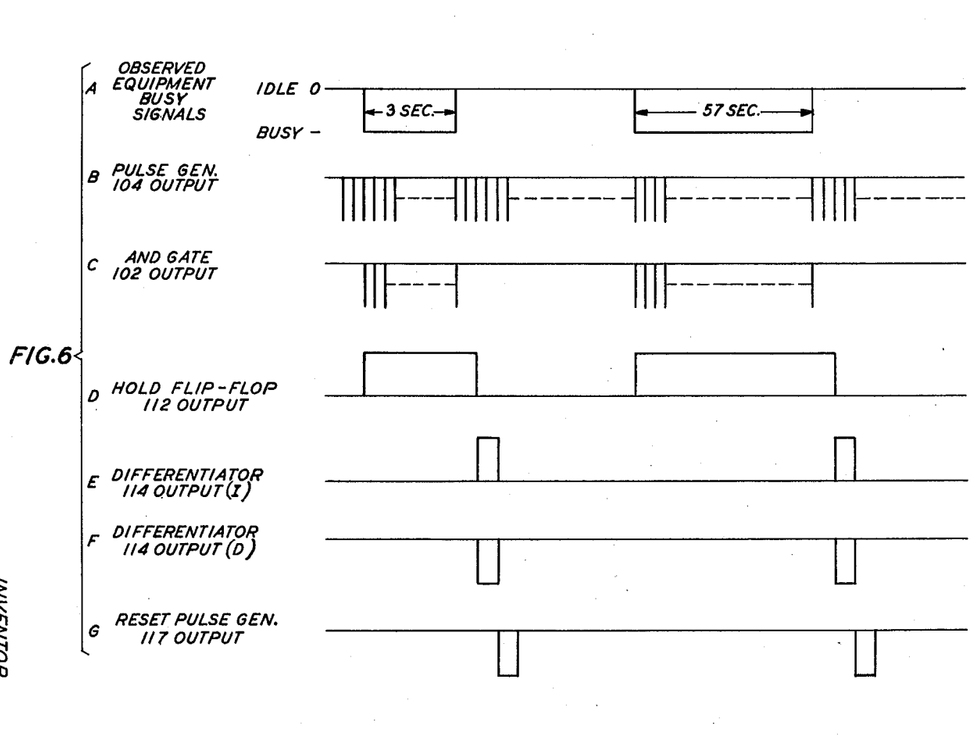
FIG. 6 discloses the nature of and the relationship between the pulses produced by the various circuits.

It has been stated that the precise nature of the busy signals from the observed equipment is not critical since the present invention could readily be arranged to respond to any type of signal. Although this is quite true, the signals applied to AND gate 102 from the equipment 101 and the pulse generator 104 must have a suitable relationship therebetween so that the simultaneous reception of the two will open the AND gate. Therefore, in order to illustrate the system operation it is assumed herein that the observed equipment produces an output signal of "0" volt when idle and an output signal having a negative polarity when busy. Also, it is assumed that the pulse generator produces a train of negative going pulses of a suitable amplitude and frequency. The nature of and the relationship between the output signals of equipment 101, pulse generator 104 and AND gate 102 is shown on FIGS. 6A, 6B and 6C. FIG. 6A discloses the output signals of equipment 101 for holding times of 3 and 57 seconds.

FIG. 6B discloses the negative pulses produced by pulse generator 104.

FIG. 6C discloses the nature of the signals appearing on the output of AND gate 102 and, specifically, discloses how the negative pulses from generator 104 appear at the output of the gate only when its two input terminals are driven negative by the simultaneous reception of signals from equipment 101 and generator 104. Since the signals shown in FIGS. 6A and 6B are coincident only during the 3 second and 57 second holding times, negative pulses appear on the output of the gate only for the duration of these two holding times.

Divider 106 receives the output pulses from gate 102 and operates on a 60/1 basis to produce one output pulse for every 60 input pulses. The divider is shown only in block diagram form since its details comprise no part of the present invention and any prior art divider could be utilized provided it operates on a 60/1 basis. Examples of such suitable circuits are a cascaded binary counter having a forced reset upon the reception of the sixtieth input pulse or a plural order ring or chain counter whose units order operates to the base 10 and whose tens order operates to the base 6.

Figure 4:
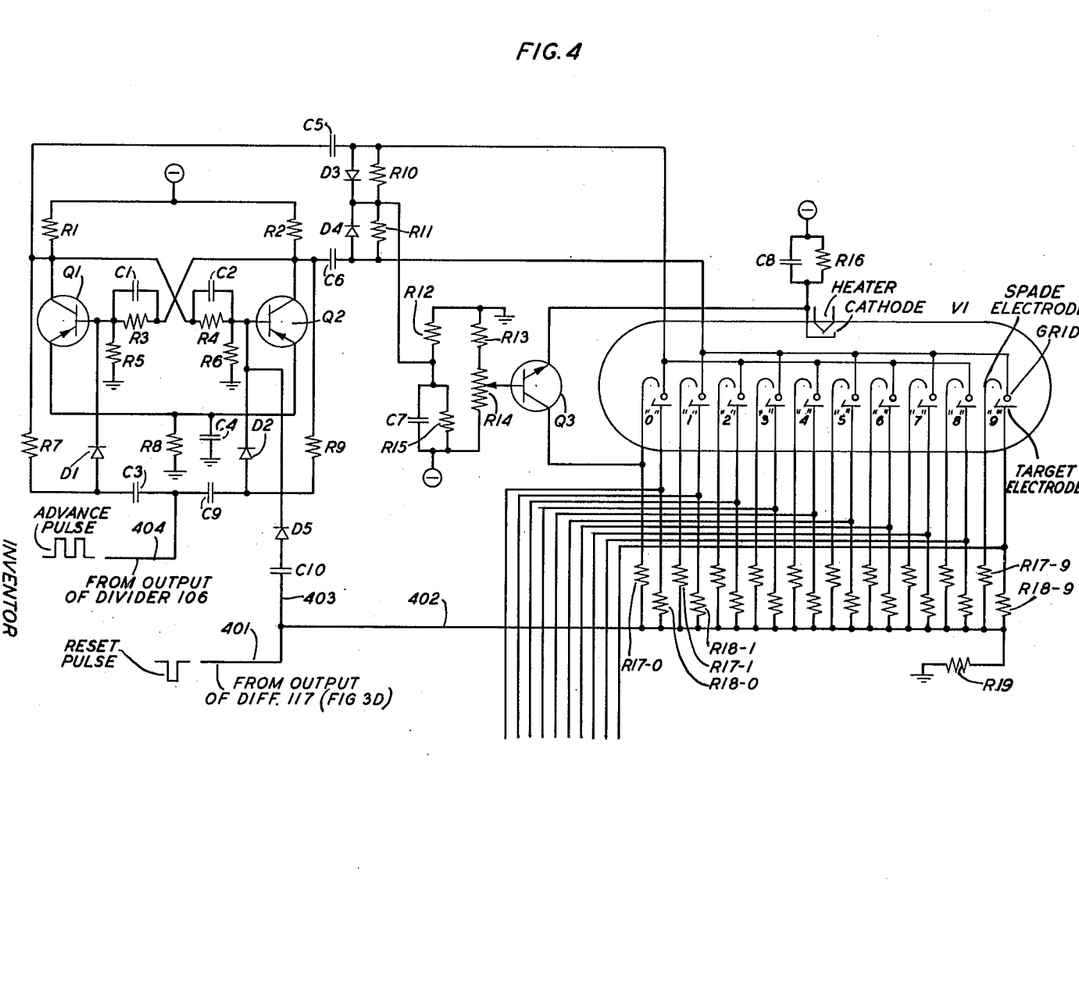
FIG. 4 discloses a distributor.

The output of the divider is applied over conductor 111 to distributor 201 which advances one position for each pulse it receives. The circuit details of the distributor are shown in FIG. 4. In the exemplary embodiment of the invention disclosed herein the distributor has 10 output positions each of which represents a holding time duration of 6 seconds, the pulse generator has an output frequency of 10 pulses per second and the frequency divider operates on a 60/1 basis. Accordingly, the divider produces an output pulse once every 6 seconds, and each of its ten output positions represents a holding time range of 6 seconds as has previously been discussed.

Figure 3B:
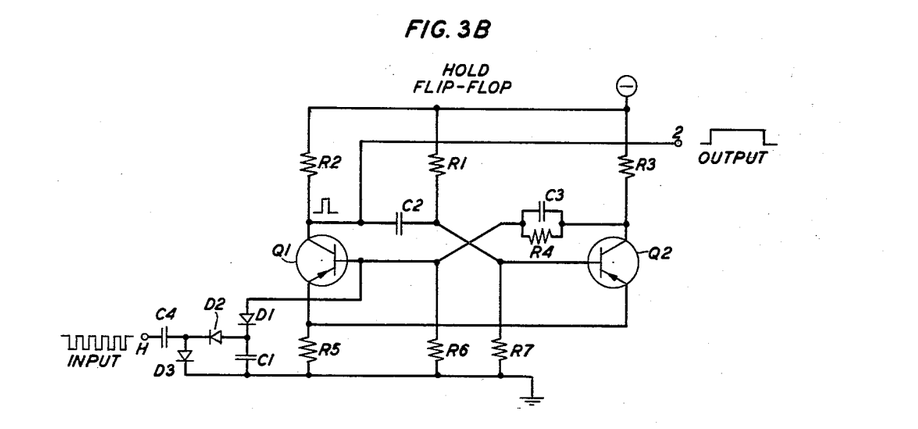
FIG. 3B discloses the circuit of a pulse generator and inverter.

The output of gate 102 is also connected over conductor 108 to the Hold flip-flop 112, the circuit details of which are shown in FIG. 3B. This circuit comprises a normally Off monostable multivibrator which is driven to and held in an On condition only during the reception of each train of pulses from gate 102. Since these pulses pass through the gate only during busy periods of the observed equipment, circuit 112 is in its On condition only during these busy periods. The flip-flop reverts to its normal condition at the end of each busy period and generates a negative going wave form which is applied to differentiator 114.

The output of the flip-flop is shown on FIG. 6D where it may be seen that a positive going rectangular wave is developed upon the reception of the first busy pulse from AND gate 102. The output remains at this relatively positive potential for the duration of the busy period plus a period of time equal to twice the pulse generator period. It then returns to its normal condition and square wave output falls negatively to its normal value.

Circuit 114 differentiates the negative going trailing edge of the output from flip-flop 112 as it reverts to its Off condition and applies a pulse derived from the differentiated signal to its two outputs designated I and D on FIG. 1. The circuit details of differentiator 114 are shown on FIG. 3C with the terminal designations within box 114 corresponding to the similarly designated terminals of 3C. The wave form of the output signals appearing on the I and D terminals of differentiator 114 are shown on FIGS. 6E and 6F respectively. From an inspection of these two figures it may be seen that the signal on the I output terminal, FIG. 6D, comprises a positive going pulse of opposite polarity from the trailing edge of the output signal of the circuit 112 while the output signal on the D terminal is a negative going pulse of the same polarity as the trailing edge of the input signal to the differentiator.

It should be observed that differentiator 114 might be termed an "end of call" or "end of busy period" recognition circuit since it generates an output pulse as flip-flop 112 returns to its Off position at the end of each busy period. The "end of busy period" signal on output D is applied over conductor 116 to the A2 inputs of all AND gates 202. Distributor 201 will, at this time, have stepped to a certain output position as determined by the number of pulses applied to divider 106 by AND gate 102 during this busy period. Only the AND gate 202 which is associated with the current output position of the distributor has its input A1 energized at this time and therefore, the pulse from differentiator 114 passes only through this particular AND gate to energize the register 203 associated therewith.

This operation is repeated for each output pulse from differentiator 114 and by this means the reception of each train of pulses from AND gate 102 causes the distributor to advance to a position dependent upon the number of pulses in the train and causes circuits 112 and 114 to operate the register associated with the final position of the distributor upon the cessation of each pulse train.

The output pulse of the I terminal of differentiator 114 is applied to differentiator (reset pulse generator) 117 which, after an appropriate time delay, generates a pulse to reset distributor 201 and divider 106 to their normal position. The circuit details of differentiator 117 are shown on FIG. 3D. The output of this circuit is shown on FIG. 6G and comprises a negative going pulse whose leading edge is coincident in time with the trailing edge from the I output of differentiator 114.

From the foregoing, it may be seen that the duration of every busy period of the observed equipment is translated into a pulse train with the quantity of pulses in each train representing the duration of a busy period for the observed equipment. The pulse train, in turn, advances the distributor a number of positions in accordance with the quantity of pulses in the train and then causes the register associated therewith to be operated at the termination thereof. This expedient provides a new and novel circuit which is highly flexible and which can be arranged to compute the distribution of holding times for any equipment regardless of the speed of its operation or the duration for which it is held during each operation. For example, if observed equipment is slow in operation and is held for a relatively long period of time, the frequency of the pulse generator can be made sufficiently slow so that each output position of the distributor will represent a specified range of minutes, seconds, or even hours, as desired, as the case may be. On the other hand, the frequency of the pulse generator may be made sufficiently high in order to study busy time distributions for fast operating electronic apparatus having short holding times.

The system description so far has assumed that the signals representative of busy condition are of a steady state nature as shown in FIG. 6A. In this case, as described, pulse generator 104 and AND gate 102 are required to translate the steady state signal from equipment 101 into a train of pulses whose duration corresponds to the duration of each steady state signal from equipment 101.

Those skilled in the art will appreciate that AND gate 102 and pulse generator 104 would not be required in the event that the observed equipment itself produced a train of output pulses when busy and conversely, produced no such pulses when idle. In this case, pulse generator 104 and AND gate 102 would not be needed and the output signal from such observed equipment could be applied directly to the input of Hold flip-flop 112 and divider 106.

Patent 2,909,608 to W. B. Callaway et al. of October 20, 1959, discloses equipment which supplies a train of pulses for each busy period of observed equipment. For example, referring to FIG. 4 of this patent, a closely spaced train of pulses is applied to register 408 for each busy period of the equipment represented thereby. The input to this register could be connected to the junction of conductors 107 and 108 on FIG. 1 of the present drawings and, when so connected, the present invention would compute the distribution of holding times for the equipment represented by register 408. It is thus seen that the present invention is versatile and flexible and can be adapted in many ways to compute the distribution of equipment holding times.

DETAILED CIRCUIT DESCRIPTION

AND Gate—FIG. 3A

This circuit comprises two transistors in a conventional cross-fed flip-flop arrangement. The biases are so arranged that the circuit comprises a monostable multivibrator with transistor Q1 being Off and transistor Q2 On during normal circuit conditions. A normal condition of the circuit occurs when either one or both of inputs A1 or A2 are grounded. The bias which normally maintains transistor Q2 conducting is supplied by resistor R1 to the base of transistor Q2.

Referring to the use of this circuit as gate 102, its inputs A1 and A2 are connected to the observed equipment 101 and the pulse generator 104, respectively, as shown in FIG. 1. On FIG. 6A it may be seen that the output of the observed equipment comprises a ground or zero potential during its idle periods and a negative potential during its busy periods. Therefore, input A1 is normally at ground potential except during busy equipment periods, at which time it assumes a negative potential. Input A2 is connected to the output of the pulse generator and is driven from a ground to a negative potential at a predetermined rate in accordance with the frequency of the output pulses from generator 104 as shown in FIG. 6B.

The gate remains in its normal condition as long as one or both of inputs A1 and A2 are grounded. The grounding of these inputs holds the base of transistor Q1 at ground potential through diode D4 and/or diode D5 and thereby maintains the transistor in an Off condition. The circuit changes state with transistor Q1 conducting and transistor Q2 nonconducting whenever both inputs A1 and A2 are simultaneously driven negative. At such times, the lower terminal of resistor R9 is not clamped to ground by input A1 and/or A2 and the negative potential on its upper terminal is applied therethrough to the base of transistor Q1 to turn it on. The turning on of transistor Q1 results in a positive pulse on its collector which is supplied through condenser C2 to the base of transistor Q2 to turn it off by driving its base positive with respect to its emitter. Transistor Q2 in turning off develops a negative pulse at its collector which is applied through condenser C5 to the output terminal 4.

The circuit remains in its On condition only so long as both inputs A1 and A2 are held negative. Referring to FIGS. 6A and 6B it may be seen that both inputs are maintained negative only for the duration of each input pulse from the pulse generator during busy periods of the observed equipment. Once the pulse on input A2 subsides and returns that terminal to ground potential, the lower terminal of resistor R9 also returns to a ground potential through diode D5 in spite of the fact that input terminal A1 is maintained negative by the output from the observed equipment for the duration of the busy period.

The grounding of the lower terminal of resistor R9, as input A2 is driven to a ground potential by the pulse generator upon the termination of each pulse, grounds the base of transistor Q1 to turn the transistor off. This results in a negative pulse on the collector of transistor Q1 which is transmitted through condenser C2 to the base of transistor Q2 thereby turning it on and restoring the circuit to normal.

Figure 5:
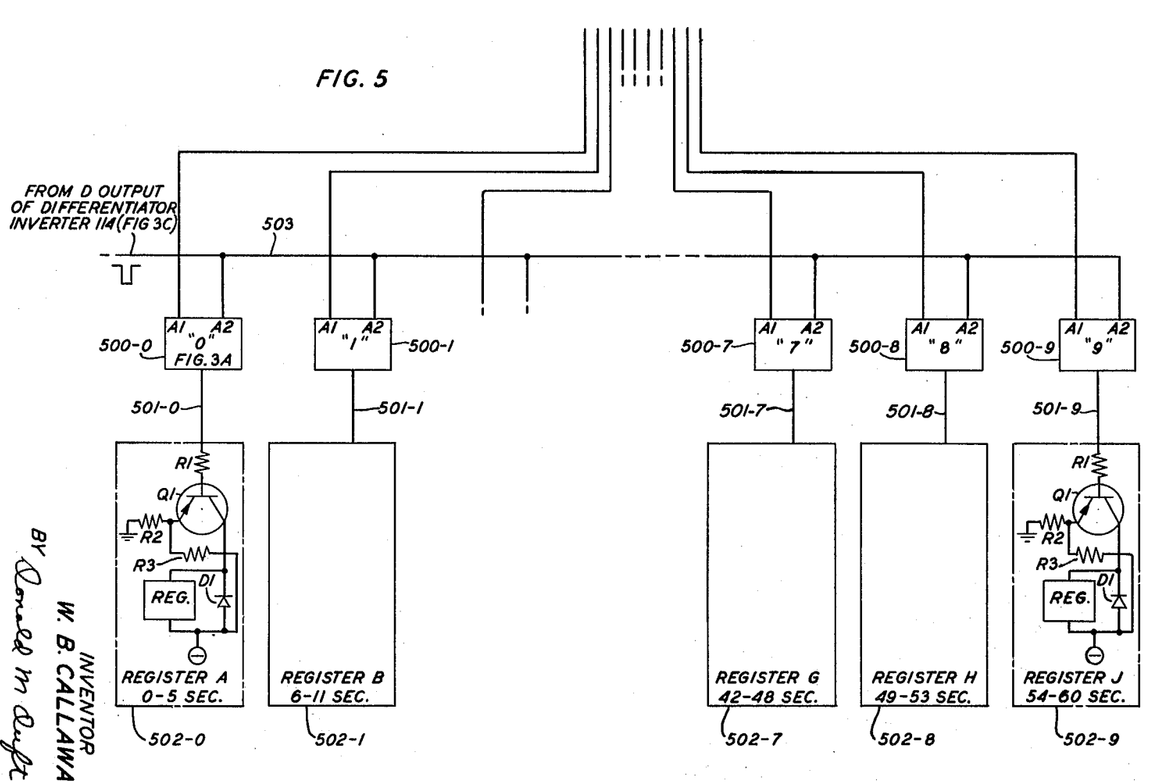
FIG. 5 discloses the circuit details of the registers used in the present invention.

The AND gate just described is also used in connection with the registers on FIGS. 2 and 5 and its operation in connection therewith is similar to that described for gate 102.

Hold Flip-Flop—FIG. 3B

This circuit is basically similar to that of FIG. 3A in that it also comprises a monostable multivibrator which is biased so that transistor Q1 is normally Off and transistor Q2 is normally On. The bias which maintains transistor Q2 On is supplied through resistor R1 to the base of Q2.

The input of this circuit is connected to the output of AND gate 102 as shown on FIG. 1. Thus, no signal is applied to its input terminal H during idle equipment periods and a train of closely spaced pulses is applied thereto during each equipment busy period as shown in FIG. 6C.

The pulses applied to terminal H pass through condenser C4 and are rectified by the voltage doubler comprising diodes D2 and D3. Condenser C1 smooths the pulsating DC from the output of the voltage doubler on the right hand terminal of the diode D2. The resultant negative potential across condenser C1 is applied through diode D1 to the base of transistor Q1 to turn it on. The sudden conduction of transistor Q1 results in a positive pulse on its collector which is applied through condenser C2 to the base of transistor Q2 to turn it off. The circuit remains in its On condition as long as input pulses are applied at a steady rate to terminal H. Once the input pulses no longer appear on terminal H (due to the closing of the AND gate at the termination of an equipment busy period) the negative potential across condenser C1 begins to decay to its ambient state at a rate determined essentially by the component values of condenser C1 and resistor R6. The values of these two components are selected so that they maintain the circuit in its On condition for an interval equal to approximately that of two pulse periods of pulse generator 104 but yet, return the circuit to its Off condition if no further signal appears in the time required for reception of approximately two such pulses.

The base of transistor Q1 follows the decaying potential across condenser C1 upon the cessation of input signals and after the potential has decayed a sufficient amount, the transistor is turned off. This results in a negative pulse on its collector which is applied through condenser C2 to the base of transistor Q2 to turn it on and restore the circuit to its normal condition.

Figure 3C:
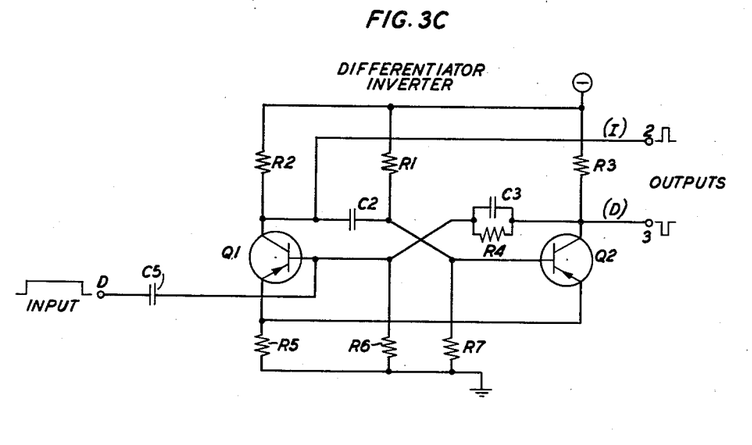
FIG. 3C discloses a differentiator-inverter.

Differentiator-Inverter—FIG. 3C

This circuit is also similar to the circuits of FIGS. 3A and 3B in that it likewise comprises a monostable multivibrator with its transistor Q1 being Off and its transistor Q2 being On during normal (idle) conditions of the circuit. The bias, which normally maintains transistor Q2 On is supplied through resitsor R1 to the base of transistor Q2.

The input of this circuit (terminal D) is connected to the output of the Hold flip-flop 112, as shown in FIG. 1. As shown in FIG. 6D, the output of the Hold flip-flop comprises a positive going square wave whose leading edge is coincident with the beginning of each buy period and which terminates and returns to a ground potential shortly after the termination of the busy period as measured by a time equal to twice the period of pulse generator 104.

The reception of the positive going leading edge of the input pulse on terminal D has no effect upon the circuit since transistor Q1 is already in an off condition. Thus, the circuit does not respond to the initial portion of the output pulse from the Hold flip-flop. The trailing edge of the input pulse comprises a negative going signal as shown in FIG. 6D. The appearance of this negative going signal on input terminal D results in a negative going potential being applied through condenser C5 to the base of transistor Q1 to turn it On. The turning On of transistor Q1 produces a positive going pulse on its collector which is applied to the (I) output terminal 2 and also is applied through condenser C2 to the base of transistor Q2 to turn it off. The turning off of transistor Q2 produces a negative going pulse on its collector which is applied to the (D) output on terminal 3.

Summarizing so far, the differentiator-inverter of FIG. 3 does not respond to the positive going leading edge of the signal from Hold flip-flop 112 at the beginning of a busy period. Instead, it responds to the negative going trailing edge of the same pulse upon the termination of each busy period. This negative going signal causes the circuit to switch to its On condition and produce a positive pulse on (I) output terminal 2 and a negative pulse on its (D) output terminal 3.

The circuit remains in its switched or On condition for only a short time as determined essentially by the component values of condenser C2, resistor R1 and resistor R7. Once condenser C2 has discharged a sufficient amount, transistor Q2 begins to conduct once more and in so doing, turns transistor Q1 off and restores the circuit to its normal condition. The restoration of the circuit to its normal or Off condition results in the termination of the positive output pulse on (I) terminal 2 and the negative output pulse on (D) terminal 3.

The negative pulse on (D) terminal 3 is applied to the A2 input of each AND gate on FIGS. 2 and 5 to operate the one register whose AND gate input terminal A1 is connected to the current output position of distributor 201. The positive output pulse on (I) terminal 2 is applied to the input of differentiator 117 which, in turn, develops a reset pulse to restore the system to its normal condition subsequent to the operation of the register.

Figure 3D:
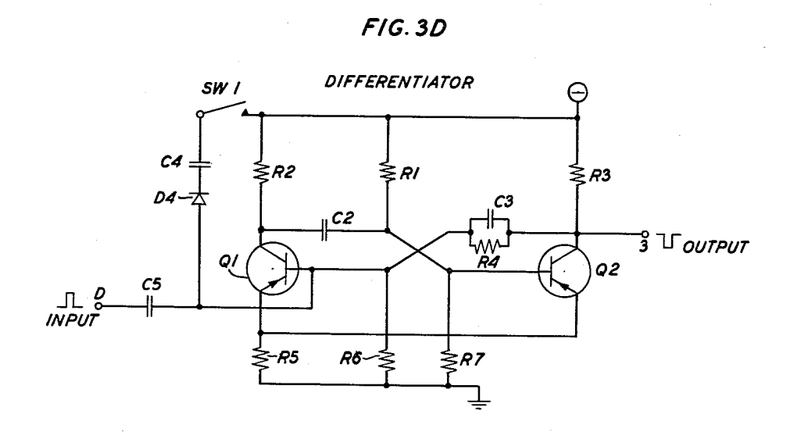
FIG. 3D discloses a circuit which performs a differentiating function.

*Differentiator—FIG. 3D*

This circuit is identical to that of the differentiator-inverter of FIG. 3C, with two exceptions. The first is that the only output provided by this circuit is that appearing on the collector of transistor Q2. The second is the provision of switch SW1, condenser C4, and diode D4.

The normal condition of this circuit is similar to that of the circuit of FIG. 3C with transistor Q2 being On and transistor Q1 being Off. The input of this circuit is connected to the output of the differentiator-inverter circuit of FIG. 3C and the purpose of the circuit is to generate a reset pulse to reset the entire system to its normal condition.

The relationship between the circuits of FIGS. 3C and 3D may best be seen by referring to FIG. 6E which illustrates the (I) output of differentiator-inverter 114 and to FIG. 6G which illustrates the output signal of differentiator circuit 117. As may be seen from a study of these two figures, this circuit remains in its normal condition until the reception of the negative going trailing edge of the (I) output of circuit 114. The reception of this negative signal momentarily flips the circuit to its On condition and thereby develops a negative output pulse on the collector of transistor Q2 which is applied to output terminal 3. The circuit remains in its On condition essentially for the time required for condenser C2 to discharge through resistors R1 and R7. When the condenser has discharged a sufficient amount the circuit returns to its normal condition and terminates the output pulse on terminal 3.

Referring to FIGS. 1 and 2, the output pulse generated by this circuit is applied over conductor 110 to reset divider 106 to its initial position and also is applied to distributor 201 to restore it to its normal position.

Switch SW1, condenser C4, and diode D4 are provided to ensure that the divider 106 and distributor 201 assume their proper normal reset condition once the power to the system is initially applied upon the beginning of an analysis. Switch SW1 may be associated with the main power switch (not shown) for the system whereby it closes its contacts as the power switch is turned on. The closing of the contacts of switch SW1 causes the condenser C4 to charge negatively through the series circuit comprising diode D45, the emitter base junction of transistor Q1, and resistor R5 to ground. Resistor R6 also provides a shunting path to ground from the base of transistor Q1. The charging current through this path simulates the normal input pulse applied to the circuit and therefore momentarily turns the circuit On and causes it to develop an initial reset pulse which is applied to divider 106 and distributor 201 to restore them to their normal conditions. After condenser C2 discharges, transistor Q1 is turned off and resets the circuit to its normal condition in a manner similar to that already described.

*Distributor—FIG. 4*

The distributor whose circuit is shown on FIG. 4 comprises a multiposition stepping tube designated V1, a flip-flop driver circuit comprising transistors Q1 and Q2 together with their associated circuit elements, and a reset circuit comprising transistor Q3 together with its associated circuit elements. The tube V1 comprises what is known in the art as a multiconductive position discharge device since it is capable of maintaining a discharge between its cathode and the electrodes in any one of its ten conductive positions designated 0–9.

Each conductive position, such as that shown for position 9, has a spade electrode, a grid and a target electrode. The function of the spade electrode is to shape and form the electron beam which strikes the target electrode. The purpose of the grid is to advance the electron beam to the next conductive position upon the application of the proper stepping potential thereto. If it is assumed that the tube is conducting between its cathode and the target electrode in its "0" position, the beam may be caused to advance to the succeeding or "1" position by applying a negative potential to the grid of position "0" and a positive potential to the grid of position "1." The negative potential on the grid of position "0" repels the electron beam while the positive potential on grid "1" attracts the electron beam and thereby steps it to position "1."

Each spade electrode is connected by a resistor R17 to a common reset line while each target electrode is connected to the common reset line by a resistor R18. Only the resistor R18 associated with the conductive position of the tube has a voltage drop thereacross the output signals from the tube are taken from the junction of the resistors R18 and their respective target electrodes.

The preceding description of tube V1 is believed to be sufficient since tubes of this type are well known in the art. An example of a commercially available tube well suited for this purpose is the series of beam switching tubes produced by the Burroughs Corporation of Plainfield, New Jersey. Also, Patent 2,721,955 to Sin-Pih Fan et al. of October 25, 1955, and assigned to the Burroughs Corporation, discloses a tube similar to that utilized in the present invention.

A reset pulse is applied to conductor 401 and from there over conductor 402 to the junction of resistors R17 and R18 to initiate the conduction in the "0" position of the tube when the power is first turned on as well as to reset the beam from its final conductive position to its "0" position at the end of every equipment busy period. When the power for the system is first turned on and the heaters of the tube have achieved their normal operating temperature, the electron beam is not formed on any target electrode until a negative pulse is first applied to conductor 402. This pulse is supplied by the closing of switch SW1 in the circuit of the differentiator of FIG. 3D. As already described, the closure of this switch simulates the normal negative going reset pulse normally applied by differentiator 117 via conductors 401 and 402 to the junction of resistors R17 and R18. Since there is no electron current in the tube at this time, this negative going pulse is applied through resistors R17 and R18 and tends to drive the potential of all target and spade electrodes to the level of the negative going pulse. Transistor Q3, which is connected between the cathode and the spade electrode of position "0," is normally nonconductive. However, the appearance of the negative reset pulse on the spade electrode of position "0" causes the transistor to conduct and thereby present a low impedance between the cathode and this particular spade electrode. This low impedance holds the spade electrode at a relatively positive potential with respect to the spade electrodes in the other positions and thereby causes the electron beam to form on the target electrode of position "0." Once the electron beam has formed in any position, the current through resistor R16 in the cathode circuit reverse biases the emitter base junction of transistor Q3 to turn it off and thereby effectively remove it from the circuit.

The operation of the tube V1 in response to a normal reset pulse is similar to that already described except for the fact that on these occasions the electron beam is already formed on the target electrode of a certain position and is restored to position "0" in response to the reception of the reset pulse. The slider on resistor R14 is adjusted so that the emitter base junction of transistor Q3 is forward biased when tube V1 is not conducting and is reverse biased whenever tube V1 conducts.

Transistors Q1 and Q2 together with their associated circuit elements comprise a conventional bistable flip-flop which is flipped from one position to another in response to the reception of positive going pulses on conductor 404 as applied thereto by the output of the pulse divider 106. The collector of transistor Q2 is connected through condenser C6 to the grids in the odd positions of tube V1 while the collector of transistor Q1 is connected through condenser C5 to the grids in the even positions of tube V1.

The negative pulses on conductor 401, in addition to reforming the electron beam in position "0" of tube V1, are also used to insure that the flip-flop restores to its proper condition. The positive going trailing edge of the reset pulse is applied over conductor 403, condenser C10, diode D5 to the base of transistor Q2 to turn it off and turn on transistor Q1 both when the system power is first turned on and at the end of an equipment busy period. The reset pulses are applied to transistor Q2 since the proper operation of tube V1 requires that transistor Q1 be on and transistor Q2 be off once the electron beam is formed in position "0."

Given the conditions thus described with tube V1 conducting in its position "0" and with transistor Q1 on and transistor Q2 off, the first positive pulse applied to conductor 404 is transmitted through condenser C3 and diode D1 to turn transistor Q1 off and transistor Q2 on. This, in turn, produces a negative pulse on the collector of Q1 which is applied through condenser C5 and to the grids in the even positions of the tube. This also produces a positive pulse on the collector of Q2 which is applied through condenser C6 to the grids in the odd positions of tube V1. The negative going potential on the grid of position "0" and the positive going potential on the grid of position "1," together, cause the electron beam to advance from position "0" to position "1." The next positive pulse on conductor 404 turns transistor Q1 on and transistor Q2 off and applies pulses of opposite polarity to those just described to the stepping grids to cause the electron beams to advance to position "2." Each succeeding positive pulse on conductor 404 causes the flip-flop to change state and advance the electron beam within the tube one position in a similar manner.

*Register Circuit—FIG. 5*

This circuit comprises ten registers designated 502-0 through 502-9 and ten AND gates designated 500-0 through 500-9. The input of each register is connector to the output of its associated AND gate. The A1 input of each AND gate is connected to the target electrode for an individual position of tube V1 while the A2 input of each gate is connected to conductor 503 to which is applied the negative going pulses from the D output of the differentiator inverter of FIG. 3.

Each negative pulse on conductor 503 is insufficient without more to effect further circuit operations. However, before each pulse is applied to conductor 503, sometimes zero, but usually one or more pulses are applied to conductor 404 by the pulse divider for the duration of each equipment busy period. This, in turn, causes the electron beam within tube V1 to advance to a position determined by the number of pulses applied to conductor 404 which are representative of the duration of the busy period. Finally, at the termination of the busy period, the differentiator-inverter applies a negative pulse to conductor 503. This pulse, together with the potential applied from the conductive target electrode of tube V1 to the A1 input of a particular AND gate 500 opens this particular gate and applies an output pulse via conductor 501 to the input of its associated register 502 to advance it one position.

For example, FIG. 6A discloses output signals for busy periods of 3 and 57 seconds. Referring to the 57 second busy period, tube V1 would advance to its ninth position, and hence, the target electrode in its position 9 would apply a negative potential to the input A1 of AND gate 500-9. The corresponding inputs of the other AND gates will have no potentials applied thereto at this time since they are associated with target electrodes in the non-conductive position of the tube. The negative pulse applied to conductor 503 at the termination of this call together with the potential already on terminal A1 of gate 500-9 causes the gate to open and apply a negative pulse to the input of register 501-9 to advance it one position.

Each register includes a common emitter amplifier having a conventional electromagnetically operated ratchet counter in its collector circuit which is advanced one position for each input pulse applied to the input of its associated transistor. The diode D1 in the collector circuit absorbs the induced E.M.F. developed by the coil of the counter at the termination of its operation pulse.

It is to be understood that the above-described arrangements are but illustrative of the application of the principles of the invention. Numerous other arrangements may be devised by those skilled in the art without departing from the spirit and scope of the invention.

What is claimed is:

1. In a system for determining the distribution of equipment holding times, an input circuit, means for applying a signal to said circuit for the duration of each equipment busy period, a plurality of registers each of which represents a unique range of holding times, a distributor responsive to each applied signal for selecting a register from said plurality in accordance with the duration of said applied signal, and means independent of said distributor and responsive to the reception of the signal for each busy period for operating the selected register independently of the duration of said received signal.

2. In a system for determining the distribution of equipment holding times, an input circuit, means for applying a busy signal to said circuit for the duration of each equipment busy period, a distributor having a plurality of output positions each of which represents a unique range of holding times, a register connected to each of said output positions, means for sequentially advancing said distributor from position to position during the reception of each of said busy signals, means responsive to the end of each busy signal for operating the register associated with the current output position of said distributor, and means for resetting said distributor to its initial position subsequent to the operation of said register.

3. In a system for determining the distribution of equipment holding times, an input circuit, means for applying a busy signal to said circuit for the duration of each equipment busy period, a distributor having a plurality of output positions each of which represents a unique range of holding times, a register connected to each of said output positions, distributor driving means, means for energizing said driving means for the duration of each received busy signal to effect the sequential advance of said distributor from position to position, means responsive to the end of each busy signal for operating the register associated with the current output position of said distributor, and means for resetting said distributor to its initial position subsequent to the operation of said register.

4. In a system for determining the distribution of equipment holding times, an input circuit, means for applying a busy signal to said circuit for the duration of each equipment busy period, a distributor having a plurality of output positions each of which represents a unique range of holding times, a register connected to each of said positions, distributor driving means, a gate circuit responsive to the application of each busy signal on said input circuit for interconnecting said driving means and said distributor to effect the sequential advance of said distributor from position to position for the duration of each received busy signal, means responsive to the end of each busy signal for operating the register associated with the current output position of said distributor, and means for resetting said distributor to its initial position subsequent to the operation of said register.

5. In a system for determining the distribution of equipment holding times, an input circuit, means for applying a busy signal to said circuit for the duration of each equipment busy period, a distributor having a plurality of output positions each of which represents a unique range of holding times, a register connected to each of said positions, a pulse generator, a gate circuit responsive to the reception of each busy signal for interconnecting said pulse generator and said distributor to effect the sequential advance of said distributor from position to position for the duration of each busy signal, means responsive to the end of each received busy signal for operating the register associated with the current output position of said distributor, and means for resetting said distributor to its initial position subsequent to the operation of said register.

6. In a system for determining the distribution of equipment holding times, an input circuit, means for applying a busy signal to said circuit for the duration of each equipment busy period, a distributor having a plurality of output positions each of which represents a unique range of holding times, a register connected to each of said output positions, a pulse generator, a frequency divider, a gate circuit responsive to the reception of each busy signal for interconnecting said pulse generator and said divider to effect the advance of said distributor one position for each generation of N pulses where N is the division rate of said divider, means responsive to the end of each received busy signal for operating the register associated with the current output position of said distributor, and means for resetting said distributor to its initial position subsequent to the operation of said register.

7. In a system for determining the distribution of equipment holding times, an input circuit, means for applying a busy signal to said circuit for the duration of each equipment busy period, a distributor having a plurality of output positions each of which represents a unique range of holding times, a register connected to each of said output positions, a pulse generator, a frequency divider, a gate circuit responsive to the reception of each busy signal for interconnecting said pulse generator and said divider to effect the advance of said distributor one position for each generation of N pulses where N is the division rate of said divider, a second pulse generator responsive to the end of each received busy signal for generating a pulse to operate the register associated with the current output position of said distributor, and a reset pulse generator responsive to the operation of said second pulse generator to generate a pulse to reset said distributor to its initial position subsequent to the operation of said register.

8. In a system for determining the distribution of equipment holding times, an input circuit, means for applying a busy signal to said circuit for the duration of each equipment busy period, a distributor having a plurality of output positions each of which represents a unique range of holding times, a gate circuit individually connected to each output position of said distributor, a register connected to the output of each of said gate circuits, a pulse generator, a frequency divider, a second gate circuit responsive to the application of each busy signal by said input circuit for interconnecting said pulse generator and said divider to effect the advance of said distributor one position for each generation of N pulses where N is the division rate of said divider, a second pulse generator responsive to the end of each busy signal for applying a pulse to all of said first-mentioned gate circuits, means responsive to the application of said last-named pulse whereby only the register operates whose gate circuit is connected to the current output position of said distributor, and a reset pulse generator responsive to the operation of said second pulse generator to generate a pulse to reset said distributor to its initial position subsequent to the operation of said register.

9. In a system for determining the distribution of the quantity of pulses per group in a series of sequentially received pulse groups, an input circuit for receiving said pulses, a distributor having a plurality of output positions each of which represents a unique range of pulses per group, a register connected to each of said output positions, means responsive to the reception of each of said pulse groups for sequentially advancing said distributor for connecting signalwise said input circuit from one of said output positions to another in accordance with the number of pulses in each of said received pulse groups, means responsive to the reception of the last pulse in each group and operative independently of the number of pulses in each group for operating the register associated with the output position to which said input circuit is then connected signalwise, and means for resetting said distributor to its initial position after the reception of each pulse group.

10. In a system for determining the distribution of the quantity of pulses per group in a series of sequentially received pulse groups, an input circuit for receiving said pulses, a distributor having a plurality of output positions each of which represents a different range of pulses per group, a register connected to each of said output positions, a pulse divider interconnecting said input circuit and said distributor for causing said distributor to advance one position in response to the reception of N pulses where N is the division rate of said divider, means responsive to the reception of the last pulse in each group for operating the register associated with the output position to which said distributor has advanced, and means for resetting said distributor to its initial position after the reception of each pulse group.

References Cited in the file of this patent

UNITED STATES PATENTS

| | | |
|---|---|---|
| 2,115,808 | Germanton | May 3, 1938 |
| 2,194,072 | Humphries | Mar. 19, 1940 |
| 2,301,336 | Sigo | Nov. 10, 1942 |
| 2,350,177 | MacKen | May 30, 1944 |
| 2,378,541 | Diamond | June 19, 1945 |
| 2,708,691 | Molnar | May 17, 1955 |
| 2,909,608 | Callaway et al. | Oct. 20, 1959 |
| 2,918,531 | Lomax | Dec. 22, 1959 |